(12) United States Patent
Horsting et al.

(10) Patent No.: US 6,720,526 B2
(45) Date of Patent: *Apr. 13, 2004

(54) METHOD AND APPARATUS TO FORM DIMENSIONALLY CONSISTENT ORIFICES AND CHAMFERS BY LASER USING SPATIAL FILTERS

(75) Inventors: John James Horsting, Williamsburg, VA (US); Christoph Hamann, Williamsburg, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/971,689

(22) Filed: Oct. 9, 2001

(65) Prior Publication Data

US 2003/0024906 A1 Feb. 6, 2003

Related U.S. Application Data

(63) Continuation-in-part of application No. 09/917,917, filed on Jul. 31, 2001, now Pat. No. 6,635,847.

(51) Int. Cl.⁷ .......................... B23K 26/38; B23K 26/06
(52) U.S. Cl. ............................ 219/121.71; 219/121.7; 219/121.73
(58) Field of Search .................... 219/121.7, 121.71, 219/121.73, 121.76, 121.77, 121.74, 121.75

(56) References Cited

U.S. PATENT DOCUMENTS

| | | | |
|---|---|---|---|
| 3,724,930 A | * 4/1973 | Farmer | |
| 3,953,706 A | 4/1976 | Harris et al. | 219/121 L |
| 4,059,876 A | 11/1977 | Ditto | 29/156.7 A |
| 4,160,894 A | 7/1979 | Stemmler et al. | 219/121 L |
| 4,370,540 A | 1/1983 | Davis et al. | 219/121 LM |
| 4,911,711 A | 3/1990 | Telfair et al. | 606/5 |
| 5,043,553 A | 8/1991 | Corfe et al. | 219/121.7 |
| 5,093,548 A | 3/1992 | Schmidt-Hebbel | 219/121.71 |
| 5,163,934 A | 11/1992 | Munnerlyn | 606/5 |
| 5,237,148 A | 8/1993 | Aoki et al. | 219/121.7 |
| 5,362,940 A | * 11/1994 | MacDonald et al. | 219/121.68 |
| 5,523,544 A | 6/1996 | Hertzel et al. | 219/121.7 |
| 5,607,606 A | 3/1997 | Mori et al. | 219/121.67 |
| 5,632,083 A | 5/1997 | Tada et al. | 29/827 |
| 5,656,186 A | 8/1997 | Mourou et al. | 219/121.69 |
| 5,670,069 A | * 9/1997 | Nakai et al. | 219/121.73 |
| 6,600,132 B2 | * 7/2003 | Horsting et al. | 219/121.7 |
| 6,603,095 B2 | * 8/2003 | Hamann | 219/121.7 |
| 6,635,847 B2 | * 10/2003 | Borsting | 219/121.71 |
| 2002/0191178 A1 | * 12/2002 | Watkins et al. | |

FOREIGN PATENT DOCUMENTS

GB 2 328 894 3/1999
JP 9-225665 A * 9/1997

OTHER PUBLICATIONS

PALS, Laser, Spatial Filters: "Spatial Filters"; pp. 1–5.
Fourier Imaging Systems, Phys 198; "Fourier Imaging Systems"; Mar. 19, 1997; pp. 1–4.

* cited by examiner

Primary Examiner—Geoffrey S. Evans

(57) ABSTRACT

A method of and apparatus for forming chamfers in an orifice of a workpiece. The orifice has an axis, which extends between a first surface and second surface of the workpiece, where the first and second surfaces are parallel to each other. The chamfers are disposed between the first surface and the second surface. The method includes forming an orifice in a workpiece with a source of non-collimated light directed at the workpiece at a predetermined first time interval, and forming a chamfer with a source of collimated light at a second time interval during the first time interval. The apparatus includes at least one source of collimated and non-collimated light, various spatial filters that can be used with the laser light source, a non-collimated light generating arrangement, and at least one shutter and at least one iris that direct collimated and non-collimated light at the workpiece to form the orifice. The apparatus is configured such that the orifice has a surface roughness of between approximately 0.05 micron and approximately 0.13 micron and a coefficient ratio of at least approximately 0.

63 Claims, 9 Drawing Sheets

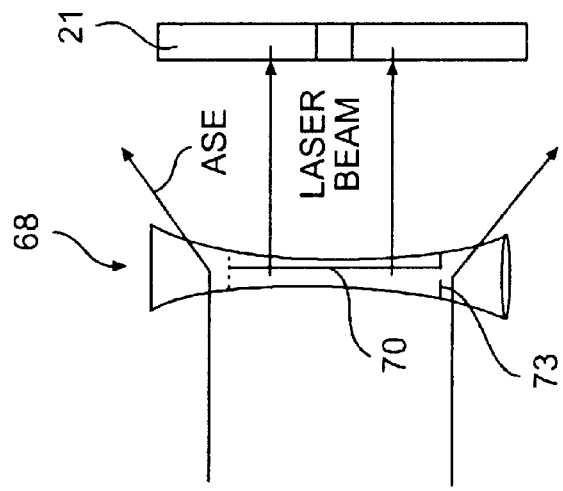
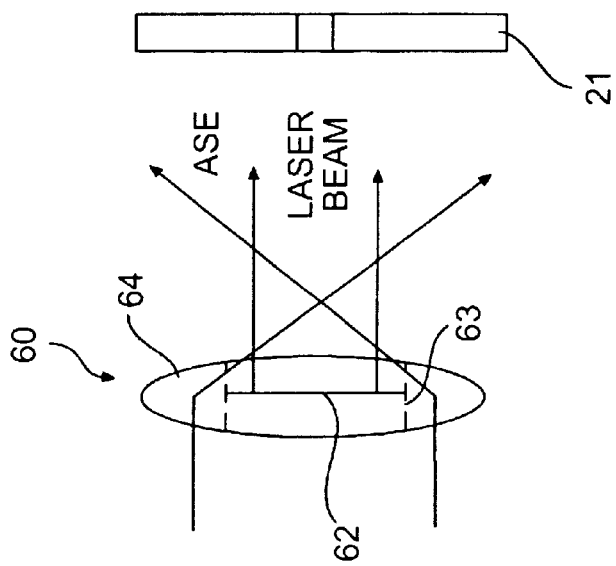

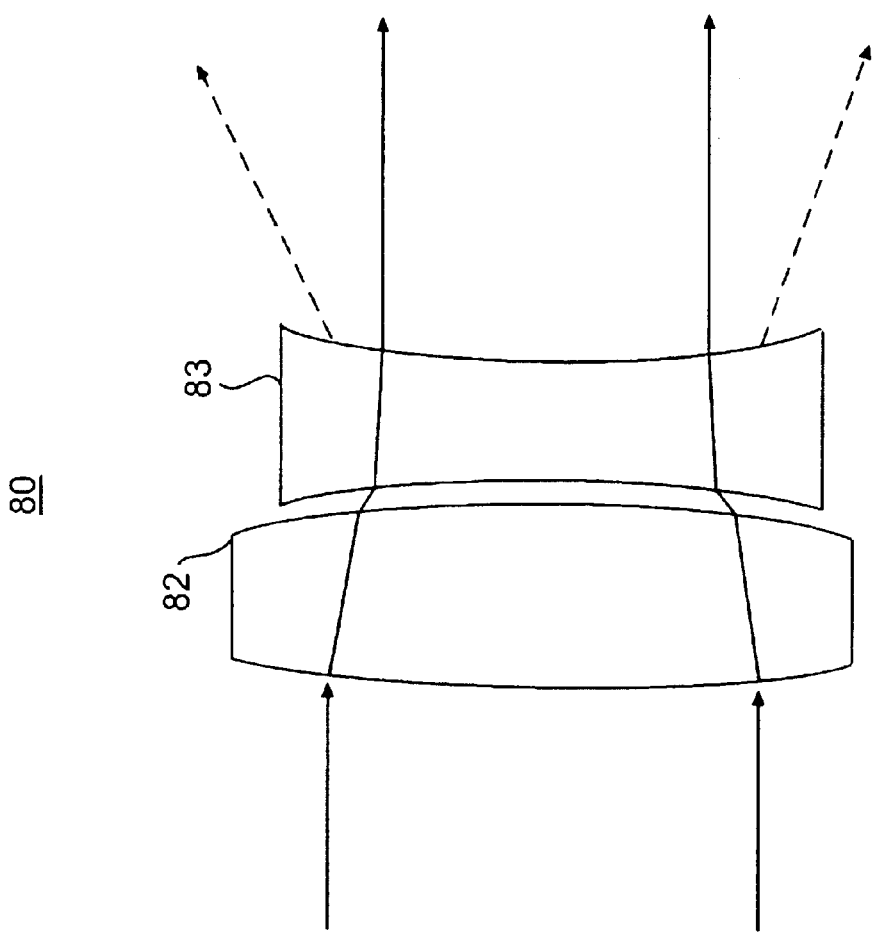

METHOD AND APPARATUS TO FORM DIMENSIONALLY CONSISTENT ORIFICES AND CHAMFERS BY LASER USING SPATIAL FILTERS

PRIORITY

This application is a continuation-in-part under 35 U.S.C. §120 of U.S. patent application Ser. No. 09/917,917, titled: "METHOD AND APPARATUS TO FORM DIMENSIONALLY CONSISTENT ORIFICES AND CHAMFERS BY LASER", filed Jul. 31, 2001 now U.S. Pat. No. 6,635,847 B2, which is incorporated herein by reference in its entirety.

BACKGROUND OF THE INVENTION

Fuel flowing through a fuel injector typically exits at a nozzle end of the fuel injector. The nozzle end is believed to have a disk with at least one orifice to control, in part, the spray pattern and the direction of the fuel exiting the fuel injector.

The orifice is believed to be formed by drilling or by punching through a workpiece. The method of drilling orifices for fuel injector is believed to be electric discharge machining (EDM) that can form orifices of 150 to 200 microns in diameter. It is believed that one of the many disadvantages of EDM is the fact that the holes are typically formed without any favorable entry or exit geometry for the orifices, thereby affecting the flow through the orifices. It is believed that to maintain the same amount of fuel flow with the smaller orifice may require more than four times the number of the larger orifices. This is believed to reduce productivity in the manufacturing of the fuel injector. Additionally, it is believed that EDM forming of the orifices are not uniform between individual injectors, thereby causing the fuel injector spray to also be non-uniform between individual injectors.

Future emission standards for gasoline and diesel engines are believed to require the use of smaller orifices for smaller fuel spray droplets and shorter fuel spray duration. It is believed that fuel spray pattern and flow should remain uniform between adjacent cylinders in a multi-cylinder engine.

It is believed that smaller orifices can be formed with no loss in productivity through the use of laser machining. At least two techniques are believed to be used for laser machining orifices. One is trepanning or helical drilling, the other is percussion drilling. Percussion drilling is believed to be less than desirable due to the random nature of metal heating and expulsion that most likely results in a non-cylindrical or non-circular orifice. Trepanning, on the other hand, is believed to be more precise as a center hole is believed to be initially formed before the formation of the orifice. Helical drilling is similar to trepanning but without the initial formation of a center hole. However, it is believed that neither trepanning nor percussion drilling provides for a desired formation of entry and exit geometry in the orifices.

SUMMARY OF THE INVENTION

The present invention provides for at least one method of forming chamfers and an orifice together while maintaining dimensional consistency between a plurality of orifices formed by the method. In one preferred embodiment of the invention, the method is achieved by separating collimated light from at least one laser light source with a spatial filter; forming at least one orifice in a workpiece with the collimated light during a predetermined first time interval; and forming at least one chamfer with non-collimated light at a second time interval during the first time interval. The orifice formed by the method has an axis, which extends between a first surface and second surface of the workpiece with the at least one chamfer being disposed between the first surface and the second surface.

In another preferred embodiment, the method is also achieved by transmitting laser light in at least one predetermined mode; separating at least one of amplified spontaneous emission of light and non-collimated light from the at least one laser light source; forming at least one orifice in a workpiece with the laser light of the at least one predetermined mode during a predetermined first time interval; and forming at least one chamfer with at least one of the amplified spontaneous emission and non-collimated lights at a second time interval during the first time interval.

In a further embodiment of the invention, a laser system is provided to machine orifices and chamfers which are dimensionally consistent between respective orifices and chamfers. The laser system comprises at least one laser light source; at least one optical arrangement that directs collimated light towards a workpiece during a first time interval and non-collimated light towards the work piece during a second time interval that overlaps the first time interval. The optical arrangement includes focusing optic disposed between the at least one laser light source and the workpiece; at least one spatial filter disposed between the laser and the focusing optic; and at least one shutter and iris arrangement disposed between the spatial filter and the work piece.

BRIEF DESCRIPTIONS OF THE DRAWINGS

The accompanying drawings, which are incorporated herein and constitute part of this specification, illustrate an embodiment of the invention, and, together with the general description given above and the detailed description given below, serve to explain the features of the invention.

FIG. 4A is an illustration of a third spatial filter usable with the laser machining system of the preferred embodiments.

FIG. 4B is an illustration of a fourth spatial filter usable with the laser machining system of the preferred embodiments.

FIG. 4D is an illustration of a sixth spatial filter usable with the laser machining system of the preferred embodiments.

DETAILED DESCRIPTION OF THE PREFERRED EMBODIMENTS

Figure 1:
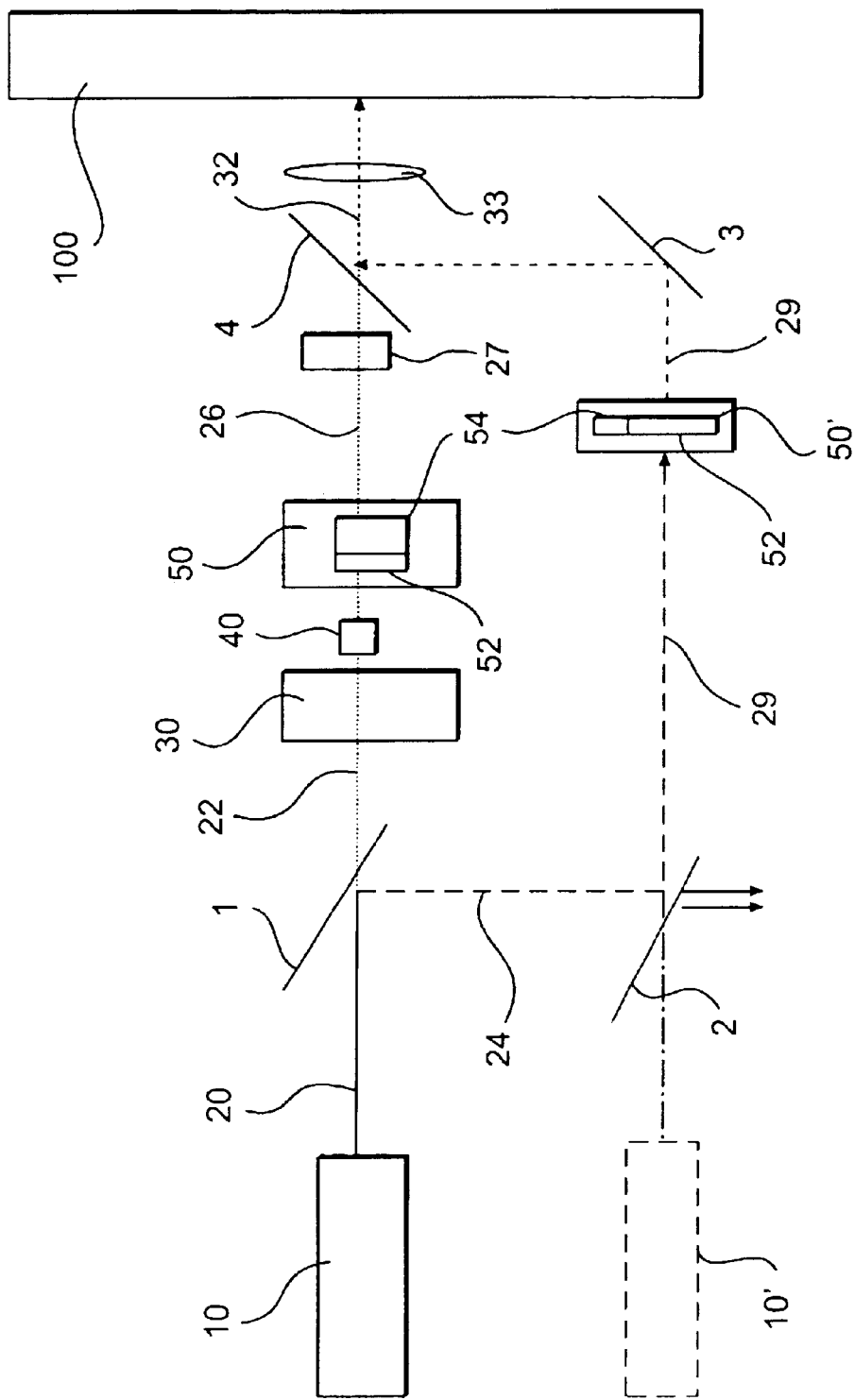
FIG. 1 is a schematic view of the laser machining system to form an orifice according to a preferred embodiment.

FIGS. 1–4 show a laser system with various elements that allows substantially simultaneous laser machining of at least one orifice and at least one chamfer in a work piece. Referring to FIG. 1, a laser light source 10 of a combination of collimated and uncollimated light ("collimated/uncollimated light") 20 is provided. Preferably, the laser light source 10 can be Model LM100 or LM150 sold by Oxford Laser™. A partial reflector 1 splits the collimated/uncollimated light 20 into two beams 22 and 24 of which collimated and uncollimated lights can be extracted. A scraper mirror 2 can be used to reflect non-collimated light from beam 24 to be directed towards a light controller arrangement 50' while allowing collimated light to pass through the scraper mirror 2.

The beam 22 is directed to a spatial filter 40 by a first focusing optic assembly 30 that can include, for example, one or more lens with a preselected focal length. Collimated light can be extracted from light beam 22 can be by a first of many techniques that include, for example, a first spatial filter assembly 40 and a collimating lens 27 disposed between the laser 10 and a work piece 100. The first spatial filter assembly 40 can also include, in one preferred embodiment, a fiber optic member 42 surrounded by a cladding 44, shown here in FIG. 3A. As a spot of light, in this case laser light 22, is focused to the fiber optic member 42, a halo is formed near the entrance of the fiber optic member 42. The halo of light includes highly diverging light and lower divergence light. The highly diverging light 22a (FIG. 3A) tends to miss the fiber optic member 42 due to the small entry point of the fiber optic member, thereby allowing light 22b that are low in divergence to be transmitted through the member 42. The light transmitted through the optical fiber member 42 results in mostly low divergence light 26 being directed at a collimating optic 27. The collimating optic 27 can be a collimating lens or a combination of lenses so as to derive collimated light 28 that can be directed to the work piece 100 or a power controlling arrangement 50.

The fiber optic member 42 can include, for example, polymer optical fiber, doped, undoped silica glass or composite optical fiber. The cladding 44 can include, for example, polymer or pure silica glass with low refractive index so as to permit total internal reflection. The cladding may, in some instances, include protective or anti-reflective coatings being coated thereon. The optical fiber member 42 can be, for example, single mode optical fiber with a core diameter of about 9 microns to 60 microns, multimode optical fiber with a core diameter of about 62 microns to about 1 millimeter. The optical fiber member 42 can be step index or graded index single mode or multi-mode optical fiber. In a step-index fiber, the refractive index of the core is uniform and undergoes an abrupt change at the core-cladding boundary. Step-index fiber has this nomenclature due to the abrupt step change in refractive index. In graded-index fibers, the refractive index of the core varies gradually as a function of radial distance from the fiber center. The optical fiber member 42 can transmit laser light in different modes depending on the normalized frequency of the fiber. The normalized frequency is a dimensionless number V determined as follows: $V=[2\pi a/\lambda]*(n_1^2-n_2^2)^{1/2}$ where n1 is the core index of refraction, n2 is the cladding index of refraction, a is the core diameter, and is λ the wavelength of light in air.

The number of modes that can exist in a fiber is a function of V. As the value of V increases, the number of modes supported by the fiber increases. Preferably, the optical fiber member 42 transmits the laser light in the fundamental mode of the optical fiber. Also preferably, the fiber optic member is selected so as to transmit laser light in a desired mode such that nearly all collimated light is transmitted through the optical fiber while nearly all non-collimated light is rejected or dispersed. Where a single mode optical fiber is used, conditions at which optical power of the laser source is launched ("launch conditions") into the fiber are defined by mode field diameter and the fundamental mode of the optical fiber. Where a multi-mode optical fiber is used, the launch conditions can include a preselected launch spot size and the angular distribution of the optical power into the fiber optic.

Another technique that can be used to separate collimated light from non-collimated light can be by directing the laser light by focusing optic 30' to a "scraper mirror" 2' that filters out non-collimated light (dashed arrows) leaving low divergence light that can be collimated by collimating optic 27'. The "scraper mirror" 2' essentially is a mirror with a preconfigured pin hole 52 placed at the center of the mirror that allows collimated light (solid arrows) through. As used herein, elements that are similar but used in other embodiments are denoted by a prime notation adjacent the reference numeral.

In yet another technique, a third type of spatial filter 60 can include a flat glass 62 coupled to a lens, as shown in FIGS. 4A and 4B so as to reduce the amount of amplified spontaneous emission ("ASE") of light produced by the laser such that the remaining light consists mostly of stimulated light emission (i.e. "laser light"). In FIG. 4A, the converging lens is configured such that a hole 63 can be formed through the lens so as to permit a flat glass plate 62 to be disposed in the lens. The diameter of the flat glass 62 is configured such that laser light which is low in divergence passes through the flat glass 62 (disposed within a hole 63 formed in the converging lens 64) while the higher divergence laser light is focused towards the axis of the laser light by the converging lens 64. In a variation of this technique, the hole 63 can be used in place of the flat glass or lens 62, thereby eliminating the flat lens 62. A collimating optic arrangement, a pin hole or scraper mirror 2' arrangement can be used to remove the amplified spontaneous light emission and or the non-collimated light produced by the laser. Likewise, in FIG. 4B, a fourth type of spatial filter includes a flat glass 70 being coupled to a diverging lens 72. Again, the diameter of the flat glass is configured such that laser light which is low in divergence passes through the flat glass 70 (disposed within a hole 73 formed in the diverging lens 72) while the higher divergence laser light is focused towards the axis of the laser light by the diverging lens 72. The flat glass or lens could be removed thereby having a lens with a hole of a preselected diameter formed in the lens. The hole, in effect, would act like a flat glass to allow light with low divergence to pass through.

Figure 4C:
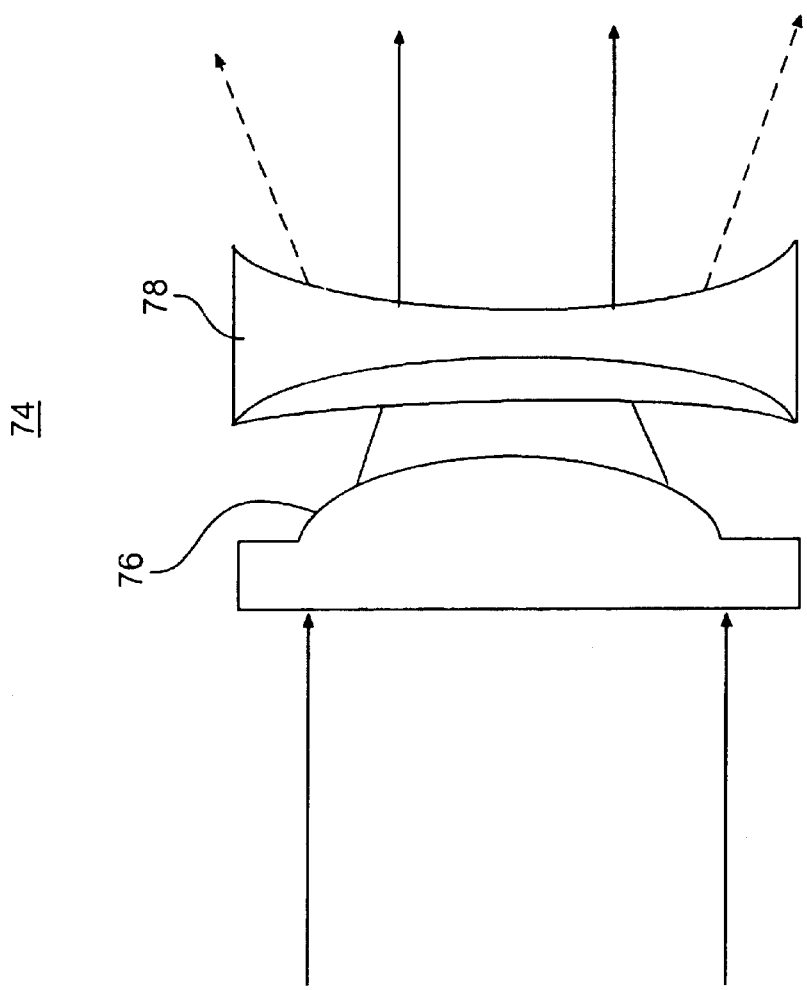
FIG. 4C is an illustration of a fifth spatial filter usable with the laser machining system of the preferred embodiments.
Figure 4E:
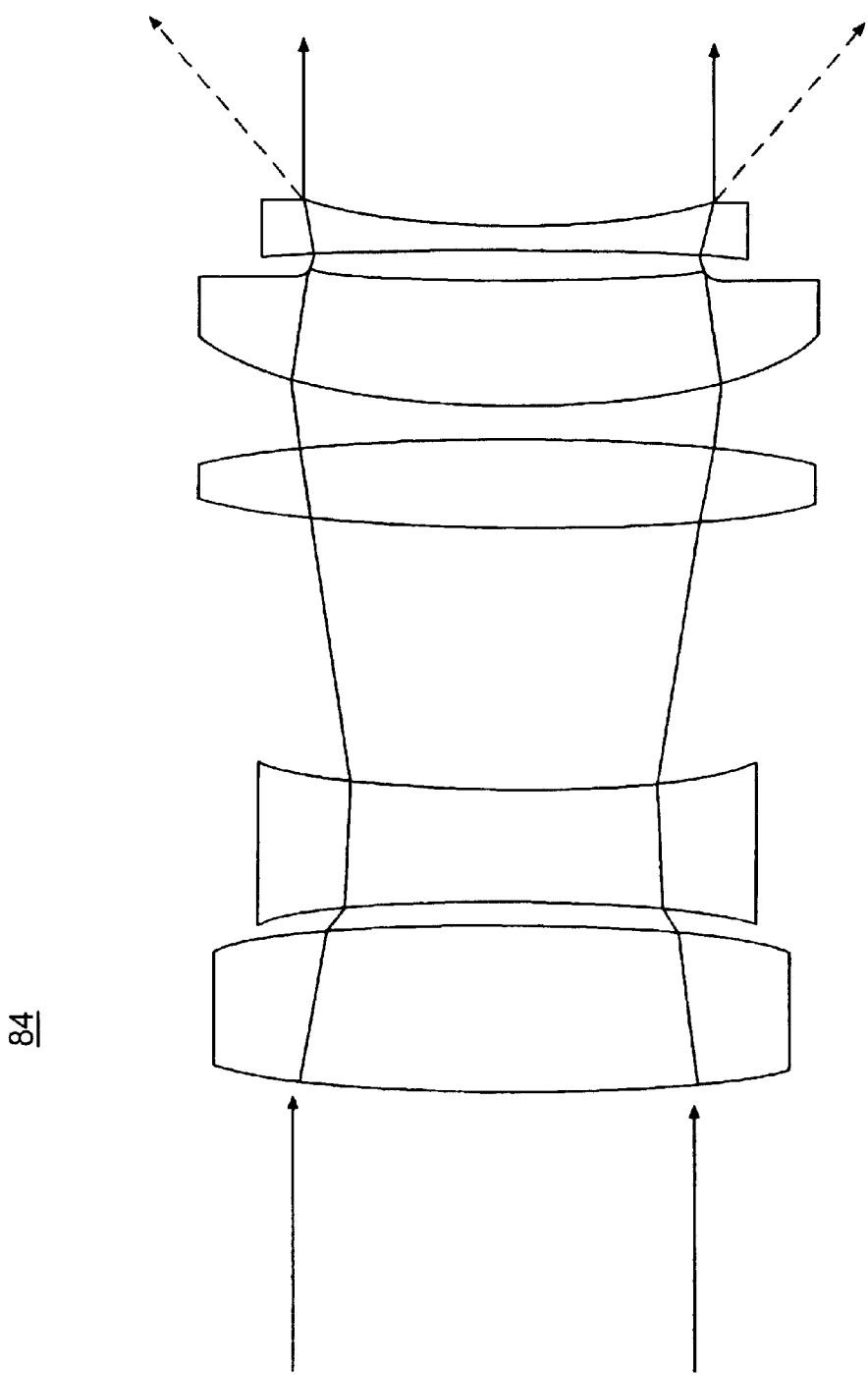
FIG. 4E is an illustration of a seventh spatial filter usable with the laser machining system of the preferred embodiments.
Figure 4F:
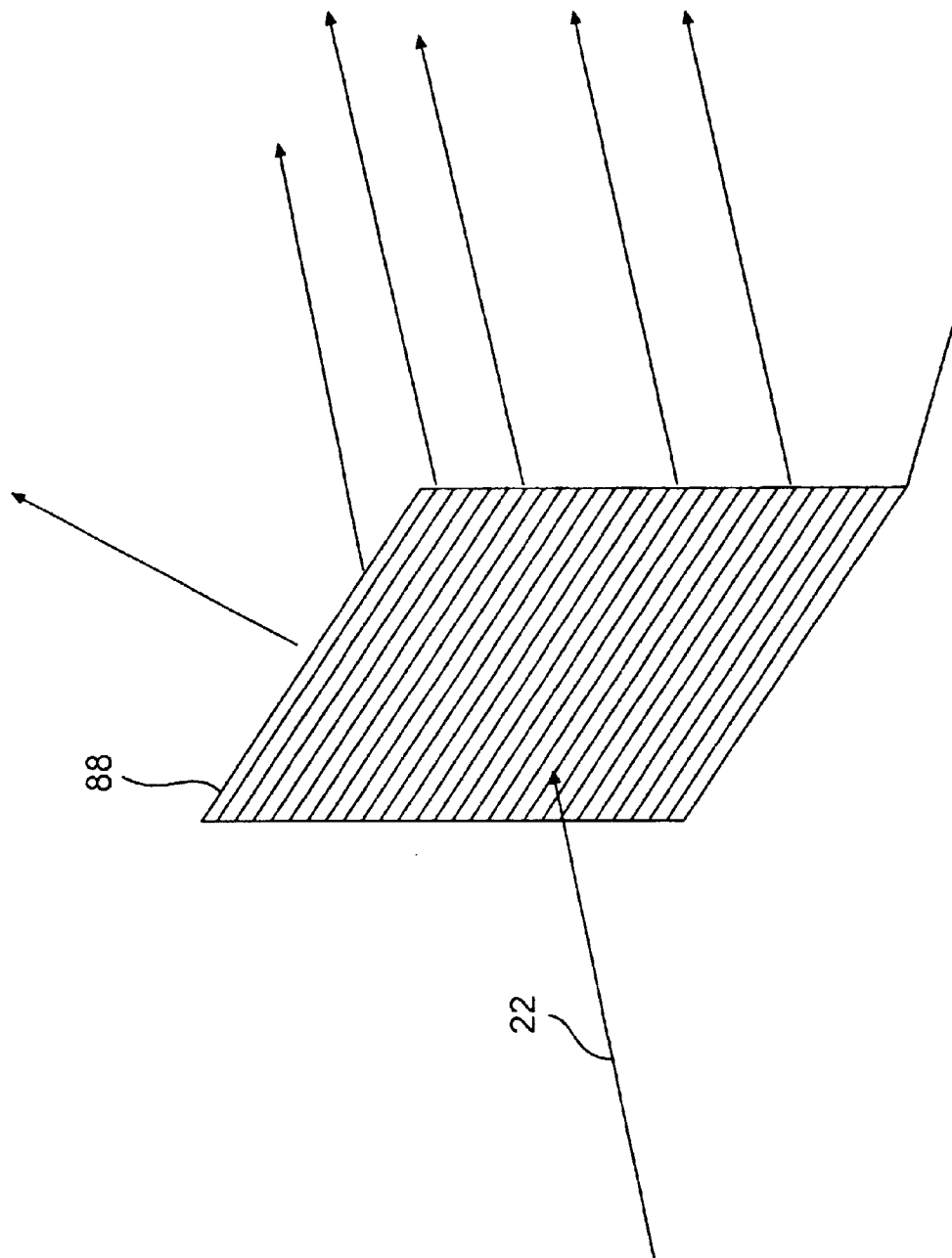
FIG. 4F is an illustration of an eight spatial filter usable with the laser machining system of the preferred embodiments.

Alternatively, a fifth spatial filter 74 (FIG. 4C) to reduce the amount of amplified spontaneous emission of light (dashed arrows) can be, for example, with an aspherical lens 76 and a negative achromatic lens 78. A sixth spatial filter 80 can include at least one Fourier lens, preferably two Fourier lens 82, 83 (FIG. 4D). A seventh spatial filter 84 can include more than two Fourier lens (FIG. 4E). An eight spatial filter can also include a diffractive optical element 88 ("DOE") that uses a plurality of closely spaced gratings to generate mostly collimated light from the laser beam 22 (FIG. 4F). The various spatial filters disclosed herein can remove nearly all of amplified spontaneous light emission and or the non-collimated light from collimated/uncollimated light 20 to provide stimulated light emission of a desired mode, i.e. collimated light 28.

Referring again to FIG. 1, the substantially collimated light 28 is delivered to a first power controlling assembly 50 that can be, for example, a shutter 52 and iris 54 assembly. The first power controlling assembly 50 can be used to deliver a desired amount of power of collimated light 28 to the work piece 100.

The other light beam 24 is diverted by a partial reflector, such as, for example a scraper mirror 2 that filters out collimated light to deliver mostly non-collimated light 29 to a second power controlling assembly 50'. The second power controlling assembly 50' can be, for example, a shutter and iris arrangement to control the intensity or the power of the non-collimated light 29. The non-collimated light 29 is reflected by reflector 3 and partial reflector 24 so as to combine the non-collimated light 29 with the collimated light 26. The combined beam 32 (of collimated light 26 and non-collimated light 29) is then focused by a focusing optic assembly 33 towards the workpiece 100. Here, the focusing optic assembly 33 can be a single lens or an array of lenses depending on the focal length, distance, power and other operating requirements of the system.

Another way to provide collimated light and non-collimated light can be, for example, by utilizing a plurality of light sources. One light source of the plurality of light sources can be a first light source that produces nearly all collimated light. Another light source of the plurality of light sources can be a second light source 10' that produces a desired amount of non-collimated light. Alternatively, at least one of the plurality of light sources can be a non-laser light source while the other light source(s) of the plurality of light sources can be a laser light source. Where two or more laser light sources are used to produce the respective collimated light and uncollimated light, the laser light sources can be individually pulse width modulated to control the power density or irradiance of the respective collimated light and non-collimated light. The use of two or more light sources are believed to eliminate separate optical arrangements 30, 28 and light controlling assemblies 50, 50' that are believed to be required for a single light source system.

The low divergence light 26 leaving the spatial filter is focused by collimating optic 27 so as to achieve substantially collimated light 28. The substantially collimated light 28 and the non-collimated light 29 are delivered to another partial reflector 1 that, preferably, permits the lights 28 and 29 to combine into beam 32 to machine the orifice and the chamfer. In one preferred embodiment, the collimated light 28 can be controlled and directed at the workpiece 100 to form at least one orifice during a first time interval while the non-collimated light 29 (produced by a laser or a non-laser light source) can also be independently controlled and directed at the workpiece 100 at a predetermined second time interval to form at least one chamfer. The power density or irradiance of the respective collimated and uncollimated light (from a single laser source, separate laser sources, or a laser with a non-laser) can be regulated to define a ratio of collimated light to non-collimated light. In particular, the power of the collimated and non-collimated lights 28 and 29 can be controlled, for example, by using at least one pulsed laser machine, and by pulse width modulation and/or by varying at least one of the lights 28 and 29 as a function of a predetermined irradiance and/or fluence. Alternatively, at least one continuous wave laser machine can be used instead of a pulsed laser machine.

Preferably, the ratio of irradiance, or power density, between the collimated and non-collimated light 28, 29 can be between approximately one to ten times, and the diameter of the non-collimated light 29 can be a fraction or whole number of a diameter of the collimated light 28. The laser light source 10 can be either a gas or a solid-state laser.

Preferably, the power density of the laser light source 10 should be less than or equal to $1 \times 10^{12}$ Watts per centimeter-squared (1 Terawatt/cm$^2$) and at least $1 \times 10^6$ Watts per centimeter-squared (1 Megawatt/cm$^2$). It should be noted that laser light sources with a wavelength of less than 2 microns can be used as a laser light source. Preferably, the laser light source 10 can be a copper vapor laser or a frequency doubled neodymium doped solid state laser (such as a neodymium: yttrium-aluminum-garnet (Nd: YAG) laser or neody:yttrium-vanadate (YdYVO$_4$)laser) having a wavelength between approximately 511 nanometer to approximately 578 nanometer.

Figure 2:
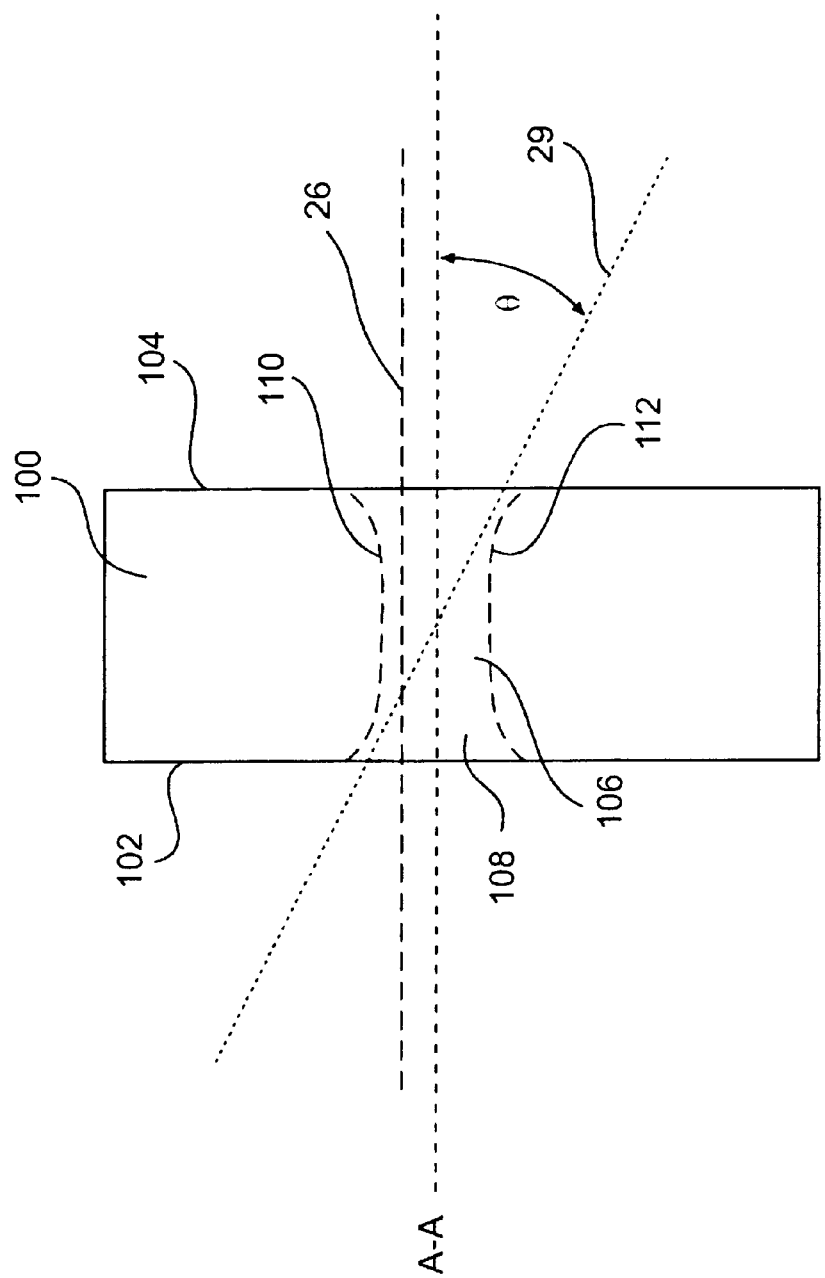
FIG. 2 is an illustration of the orifice and chamfer formed according to the preferred embodiments.
Figure 3A:
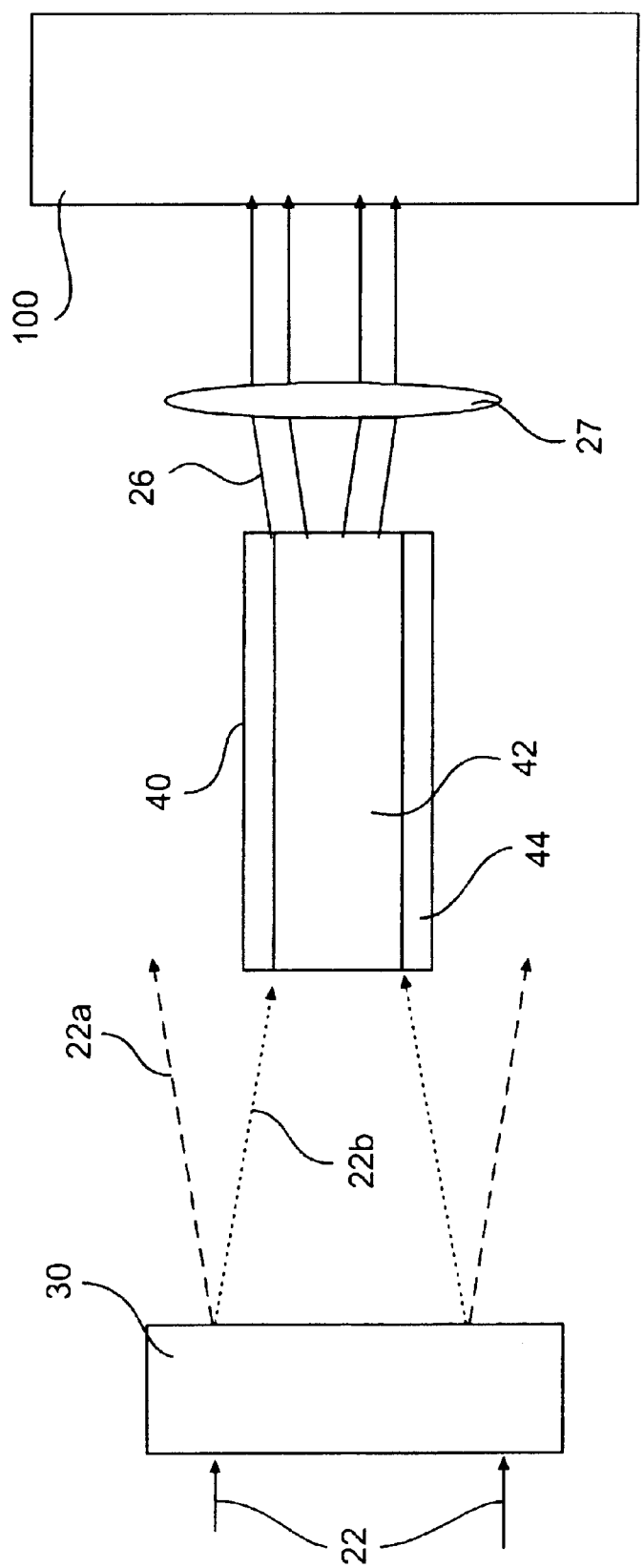
FIG. 3A is an illustration of a spatial filter using a pin hole arrangement according to a preferred embodiments.
Figure 3B:
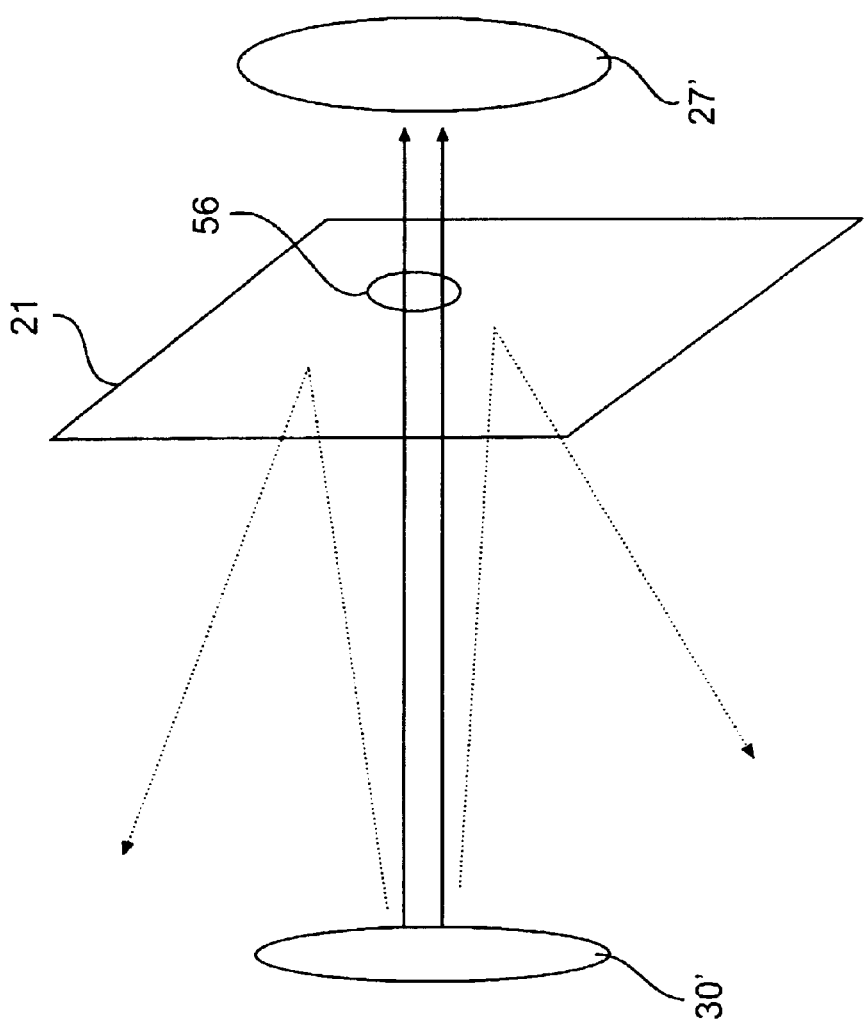
FIG. 3B is an illustration of a second spatial filter using an optical fiber member usable with the laser machining system of the preferred embodiments.

Referring now to FIG. 2, the orifice 106 has an axis A—A which extends between a first surface 102 and second surface 104 of the workpiece 100, where the first and second surfaces 102, 104 can be parallel or non-parallel to each other. Preferably, the first surface is parallel to the second surface. The at least one chamfer 108 can be disposed between the first surface 102 and the second surface 104. The orifice 106 is preferably is between approximately 20 microns and approximately 650 microns in diameter. As described herein, the term "chamfer" refers to a surface geometry of an orifice that can include an opening of the orifice or at any point between the first surface and the second surface of the at least one orifice. The surface geometry can be, for example, a square edge, a radiused taper, a taper, or a cone.

In the preferred embodiments, the first and second time intervals can overlap each other. Alternatively, the collimated light and non-collimated light corresponding to one of the first and second time intervals can be while the light corresponding to the other time interval is not initiated until a time interval has passed such that the first and second time intervals end at the same instant in time. Preferably, the first and second time intervals are initiated substantially simultaneously and can terminate at the same time or at different intervals.

In another preferred embodiment, one of the collimated light 28 or the non-collimated light 29 can be directed at the workpiece 100 to form an orifice during a first time interval while the other of the collimated light 28 and non-collimated light 29 can be rotated at a predetermined intensity at an angle of incidence θ about the axis A—A of orifice 106 to generate a chamfer during a second time interval that overlaps the first time interval.

Using the preferred embodiments, it is believed that the surface roughness $R_a$ of the orifice 106 should be less than approximately 0.2 microns and preferably can be between approximately 0.05 microns and approximately 0.13 microns such that the surface roughness and the cross-sectional shape of the chamfer(s) result in an orifice coefficient between approximately 0.6 and approximately 1.0. As used here, the term "surface roughness $R_a$" is an arithmetic mean value of the absolute values of a surface profile divided by the quantity of the values sensed by a sensing instrument, such as, for example, a surface profilometer or even by optical scanning, including a laser type atomic force microscope.

It is believed that the optimum shape for chamfers 108 of the orifice 106 can be, for example, a bell shaped chamfer 110 or a conical shaped chamfer 112. For example, an orifice may have two substantially bell shaped chamfers 110 for the respective ends of the orifice. Alternatively, the orifice may have two conical shaped chamfers 112 or a combination of conical shaped chamfers 112 at one end and a bell shaped chamfer at the other end. A conical shaped chamfer 112 can be defined by a cone whose walls diverge at a constant angle. A bellshaped chamfer 110 consists of two sections. At a first end, the walls of the bell diverge at a relatively large angle but the degree of divergence tapers off at the second end. At the second end, the divergence angle of the walls of the chamfer is very small. Although two examples are given, it should be noted, however, that the chamfer could be configured into any cross-sectional shape that, under actual flow conditions, will produce an orifice coefficient of at least 0.6. As used here, the term "orifice coefficient," or "coefficient of discharge", is a function of, among other variables, the ratio of the cross sectional area of the inlet with respect to the cross sectional area of the orifice itself as well as the Reynolds Number of the fluid flow through the orifice. The orifice coefficient is believed to be an indicator of frictional loss incurred by flow of a specified fluid within an orifice.

In operation, the method can be practiced by an apparatus that forms an orifice 106 and chamfers 108 in a workpiece 100. The orifice has an axis A—A extending between a first surface 102 and a second surface 104 of the workpiece 100. The apparatus can be a laser light source 10 of collimated and non-collimated light 28, 29 or two or more separate sources (10 and 10') of collimated light and uncollimated light. Where a single source of laser light is used, a spatial light filter (40, 50, 60, 68, 74, 80, 84), and a non-collimated light filtering arrangement, for example, a scraper mirror 2, at least one shutter 52 and at least one iris 54 assembly can be used to direct collimated and non-collimated light 28, 29 at the workpiece 100 to form the orifice 106 and the chamfer(s). By controlling the intensity of the collimated with respect to the non-collimated light and controlling the focus of the two types of light from a single source or from two or more separate light sources, the apparatus can be used to form at least one orifice 106 that has a surface roughness of between approximately 0.05 microns and approximately 0.13 microns and a coefficient ratio at least approximately 0.6.

The preferred embodiments described herein can be used to form orifices for use in fuel injectors. Other applications can include, for example, ink-jet and laser printers, microcircuits including microcircuit boards, micro-machined devices, or any other devices which require a plurality of orifices of consistent dimensionalities and an uniform orifice coefficient of at least 0.6 for each of the orifices. The dimensionalities can be, for example, the diameter of the orifice or the diameters of the chamfer that can be used to describe the cross-sectional curve of the chamfer in three-dimension.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, but that it has the full scope defined by the language of the following claims, and equivalents thereof.

What we claim is:

1. A method of forming at least one chamfer and at least one orifice in a workpiece, the at least one orifice having an axis extending between a first surface and second surface of the workpiece, the at least one chamfer being disposed between the first surfaces and the second surfaces, the method comprising:
   separating collimated light from at least one laser light source with a spatial filter;
   forming at least one orifice in a workpiece with the collimated light during a predetermined first time interval; and
   forming at least one chamfer with non-collimated light at a second time interval during the first time interval.

2. The method according to claim 1, wherein the first time interval includes a portion of the second time interval.

3. The method according to claim 1, wherein the first time interval is substantially equal to the second time interval.

4. The method according to claim 1, wherein a diameter of the at least one orifice is between approximately 20 microns and approximately 650 microns.

5. The method according to claim 1, wherein the first time interval is greater than the second time interval.

6. The method according to claim 1, wherein the second time interval is greater than the first time interval.

7. The method according to claim 1, further comprising:
   controlling a respective power of the collimated and non-collimated light.

8. The method according to claim 7, wherein the forming of the at least one orifice and the forming of the at least one chamfer further comprise:
   directing at least one of the collimated light and non-collimated light at a target at an angle of incidence, wherein the at least one of the collimated and non-collimated light are rotated with respect to the angle of incidence.

9. The method according to claim 7, wherein the controlling further utilizes at least one shutter and iris arrangement disposed between the at least one laser light source and the workpiece.

10. The method according to claim 9, wherein at least one shutter and iris arrangement includes a first shutter and iris arrangement that controls the collimated light and a second shutter and iris arrangement that controls the non-collimated light.

11. The method according to claim 7, wherein the controlling comprises pulse width modulating one of the collimated and non-collimated lights.

12. The method according to claim 7, wherein the controlling comprises varying each of the collimated and non-collimated lights as a function of a predetermined irradiance.

13. The method according to claim 7, wherein the controlling comprises varying each of the collimated and non-collimated lights as a function of a predetermined fluence.

14. The method according to claim 7, wherein the separating further utilizes an optical arrangement disposed between the at least one laser light source and the workpiece.

15. The method according to claim 14, wherein the optical arrangement comprises at least one fiber optic member.

16. The method of claim 15, wherein the fiber optic member comprises at least one of a single mode optical fiber and a multi-mode optical fiber.

17. The method of claim 16, wherein the single mode optical fiber comprises at least one of a step-index optical fiber and a graded-index optical fiber.

18. The method of claim 16, wherein the multi-mode optical fiber comprises at least one of a step-index optical fiber and a graded-index optical fiber.

19. The method of claim 18, wherein the separating further comprises launching the laser light with a predetermined optical power at an optical fiber so as to achieve predetermined launch conditions of the optical power into the optical fiber.

20. The method of claim 19, wherein the predetermined launch conditions include a fundamental mode of the optical power.

21. The method of claim 18, wherein the predetermined launch conditions include a predetermined launch spot size and angular distribution of the laser light.

22. The method of claim 15, wherein the fiber optic member comprises a core being surrounded by a cladding, the cladding being surrounded by a coating.

23. The method of claim 22, wherein the core includes a glass type core having a diameter of about 9 microns to about 1 millimeter.

24. The method according to claim 7, wherein the controlling of the collimated light further comprises rotating the collimated light at a predetermined intensity about the axis of the at least one orifice so as to generate at least one of a conical shaped chamfer and a bellshaped chamfer disposed between the first and second surfaces of the workpiece.

25. The method according to claim 1, wherein the spatial filter comprises at least one of a lens having a predetermined focal length coupled to a flat lens, at least one diffractive optical element coupled to at least one Fourier lens, or at least one scraper mirror.

26. The method according to claim 1, wherein a ratio of irradiance between the collimated and non-collimated light is between approximately 1 to 1 and approximately 0.1 to 1.

27. The method according to claim 1, wherein a power density of the collimated light comprises approximately one to ten times a power density of the non-collimated light.

28. The method according to claim 1, wherein the at least one laser light source comprises at least one of a gas or a solid-state laser.

29. The method according to claim 1, wherein a wavelength of the at least one laser light source comprises a wavelength of approximately less than two microns.

30. The method according to claim 29, wherein the at least one laser light source comprises at least one of a vapor laser and a solid state laser.

31. The method accordingly to claim 30, wherein the at least one laser light source comprises at least one of a copper vapor laser and a neodymium doped solid-state laser.

32. The method according to claim 31, wherein the solid state laser includes at least one of a frequency doubled neodymium: yttrium-aluminum-garnet (Nd: YAG) laser and a neodymium:yttrium-vanadate (YdYVO$_4$) laser.

33. The method according to claim 1, wherein a diameter of the non-collimated light comprises a diameter of at least a fraction or a whole number of a diameter of the collimated light.

34. The method according to claim 1, wherein the surface roughness of the at least one orifice comprises a surface roughness between approximately 0.05 micron to approximately 0.13 micron.

35. The method according to claim 1, wherein the surface roughness of the at least one orifice is such that the orifice coefficient is at least 0.6.

36. The method according to claim 1, wherein the spatial filter comprises at least one of an aspherical lens coupled to a negative achromatic lens, an optical fiber, a Fourier lens or at least one diffractive optical element.

37. The method according to claim 1, wherein the at least one light source further comprises at least one collimated light source and at least one non-collimated light source.

38. The method according to claim 1, wherein the forming of the at least one chamfer further comprises forming at least one of a bellshaped chamfer and a conical shaped chamfer between the first surface and the second surface of the workpiece along the axis of the orifice.

39. A method of forming at least one chamfer and at least one orifice in a workpiece, the at least one orifice having an axis extending between a first surface and second surface of the workpiece, the at least one chamfer being disposed between the first surfaces and the second surfaces, the method comprising:

transmitting laser light in at least one predetermined mode;

separating at least one of amplified spontaneous emission of light and non-collimated light from the at least one laser light source;

forming at least one orifice in a workpiece with the laser light in the at least one predetermined mode during a first time interval; and forming at least one chamfer with at least one of the amplified spontaneous emission and non-collimated lights at a second time interval during the first time interval.

40. The method of claim 39, wherein the separating comprises transmitting the laser light to a fiber optic member.

41. The method of claim 39, wherein the fiber optic member comprises at least one of a single mode optical fiber and a multi-mode optical fiber.

42. The method of claim 41, wherein the single mode optical fiber comprises at least one of a step-index optical fiber and a graded-index optical fiber.

43. The method of claim 41, wherein the multi-mode optical fiber comprises at least one of a step-index optical fiber and a graded-index optical fiber.

44. The method of claim 41, wherein the separating further comprises launching the laser light with a predetermined optical power at an optical fiber so as to achieve predetermined launch conditions of the optical power into the optical fiber.

45. The method of claim 44, wherein the predetermined launch conditions include a fundamental mode of the optical power.

46. The method of claim 45, wherein the predetermined launch conditions include a predetermined launch spot size and angular distribution of the laser light.

47. The method of claim 39, wherein the fiber optic member comprises a core being surrounded by a cladding, the cladding comprising at least one of a polymer, a pure silica glass and a glass composite material.

48. The method of claim 47, wherein the core includes at least one of a polymer type and a glass type core having a diameter of about 9 microns to about 1 millimeter.

49. The method of claim 47, wherein the cladding includes a material having a low refractive index relative to refractive index of the core.

50. A laser system to machine at least one orifice and at least one chamfer in a workpiece, the laser system comprising:

at least one laser light source;

at least one optical arrangement that directs collimated light towards the workpiece during a first time interval and non-collimated light towards the work piece during a second time interval that overlaps the first time interval, the optical arrangement including:

focusing optic disposed between the at least one laser light source and the workpiece;

at least one spatial filter disposed between the focusing optic and the work piece; and at least one shutter and iris arrangement disposed between the spatial filter and the work piece.

51. The laser system of claim 50, wherein the at least one spatial filter comprises at least one of an aspherical lens coupled to a negative achromatic lens, an optical fiber, a Fourier lens or at least one diffractive optical element.

52. The laser system of claim 50, wherein the fiber optic member comprises at least one of a single mode optical fiber and a multi-mode optical fiber.

53. The laser system of claim 52, wherein the single mode optical fiber comprises at least one of a step-index optical fiber and a graded-index optical fiber.

54. The laser system of claim 52, wherein the multi-mode optical fiber comprises at least one of a step-index optical fiber and a graded-index optical fiber.

55. The laser system of claim 50, wherein the at least one spatial filter comprises at least one of a lens having a predetermined focal length coupled to a flat lens, at least one diffractive optical element coupled to at least one Fourier lens, or at least one scraper mirror.

56. The laser system of claim 50, wherein the at least one shutter and iris arrangement includes a first shutter and iris arrangement that controls the collimated light and a second shutter and iris arrangement that controls the non-collimated light.

57. The laser system of claim 56, wherein a ratio of irradiance between the collimated and non-collimated light is between approximately 1 to 1 and approximately 0.1 to 1.

58. The laser system of claim 56, wherein a power density of the collimated light comprises approximately one to ten times a power density of the non-collimated light.

59. The laser system of claim 56, wherein a diameter of the non-collimated light comprises a diameter which is a function of at least a fraction or a whole number of a diameter of the collimated light.

60. The laser system of claim 50, wherein the at least one laser light source comprises at least one of a gas or a solid-state laser.

61. The laser system of claim 60, wherein a wavelength of the at least one laser light source comprises a wavelength approximately less than two microns.

62. The laser system of claim 61, wherein the at least one laser light source comprises at least one of a copper vapor laser and a neodymium doped solid state laser.

63. The laser system of claim 62, wherein the neodymium doped solid state laser includes at least one of a frequency doubled neodymium: yttrium-aluminum-garnet (Nd: YAG) laser and a neodymium: yttrium-vanadate (YdYVO$_4$) laser.

* * * * *